(12) United States Patent
Nakayama

(10) Patent No.: US 12,466,335 B2
(45) Date of Patent: Nov. 11, 2025

(54) ATTACHMENT STRUCTURE OF CAMERA

(71) Applicant: HONDA MOTOR CO., LTD., Tokyo (JP)

(72) Inventor: Shingo Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/959,778

(22) Filed: Nov. 26, 2024

(65) Prior Publication Data

US 2025/0214516 A1    Jul. 3, 2025

(30) Foreign Application Priority Data

Dec. 28, 2023  (JP) ................................. 2023-222412

(51) Int. Cl.
  *B60R 11/04*  (2006.01)
  *B60R 11/00*  (2006.01)

(52) U.S. Cl.
  CPC ....... *B60R 11/04* (2013.01); *B60R 2011/0026* (2013.01); *B60R 2011/0059* (2013.01)

(58) Field of Classification Search
  CPC ............ B60R 11/04; B60R 2011/0026; B60R 2011/0059
  See application file for complete search history.

(56) References Cited

U.S. PATENT DOCUMENTS

| | | | | |
|---|---|---|---|---|
| 4,538,851 A | * | 9/1985 | Taylor | B60R 1/06 296/180.1 |
| D803,294 S | * | 11/2017 | Peabody | D16/242 |
| 2001/0054989 A1 | * | 12/2001 | Zavracky | G02B 27/017 345/8 |
| 2008/0284850 A1 | * | 11/2008 | Blaesing | B60S 1/0844 348/148 |
| 2015/0015713 A1 | * | 1/2015 | Wang | B60R 11/04 348/148 |
| 2020/0389945 A1 | * | 12/2020 | Nagaoka | B60R 11/04 |
| 2024/0011791 A1 | * | 1/2024 | Qi | G06N 3/04 |
| 2024/0017680 A1 | * | 1/2024 | Winden | H04N 23/51 |
| 2024/0067105 A1 | * | 2/2024 | St. Louis | H04N 23/65 |
| 2024/0106986 A1 | * | 3/2024 | Larson | B60R 1/04 |
| 2025/0115193 A1 | * | 4/2025 | Inbe | B60R 11/04 |

FOREIGN PATENT DOCUMENTS

JP        6482940 B2    3/2019

* cited by examiner

*Primary Examiner* — Joseph Suh
(74) *Attorney, Agent, or Firm* — Armstrong Teasdale LLP

(57) ABSTRACT

An attachment structure of a camera includes an attachment member attached to the camera, and a holding member holding the attachment member. The holding member includes a fixed frame fixed to an inner surface of a window, a hood protruding from the fixed frame toward an inboard side, and a receiving tube extending from the hood toward the inboard side and receiving the camera. The receiving tube includes a pair of engaging claws that are elastically deformable. The attachment member includes a base portion that supports the camera, and a pair of sidewall portions extending from the base portion toward an outboard side and arranged on either side of the receiving tube. Each sidewall portion is provided with an engagement hole with which each engaging claw engages from a side of an axis, and the engagement hole penetrates each sidewall portion in a direction perpendicular to the axis.

8 Claims, 11 Drawing Sheets

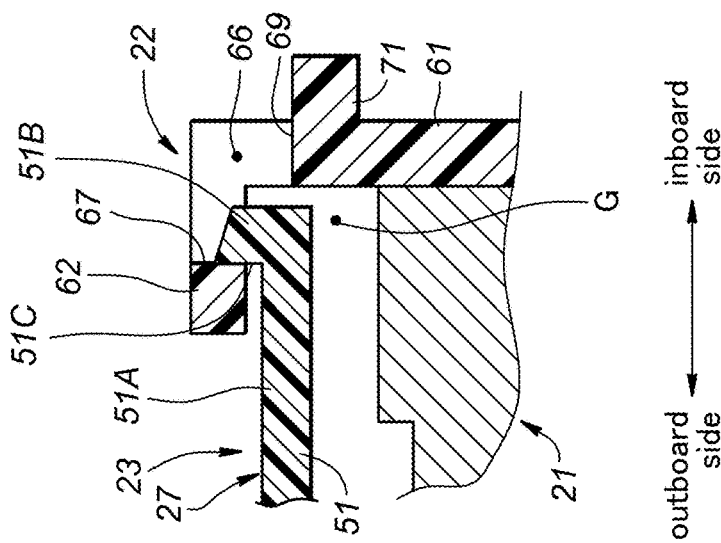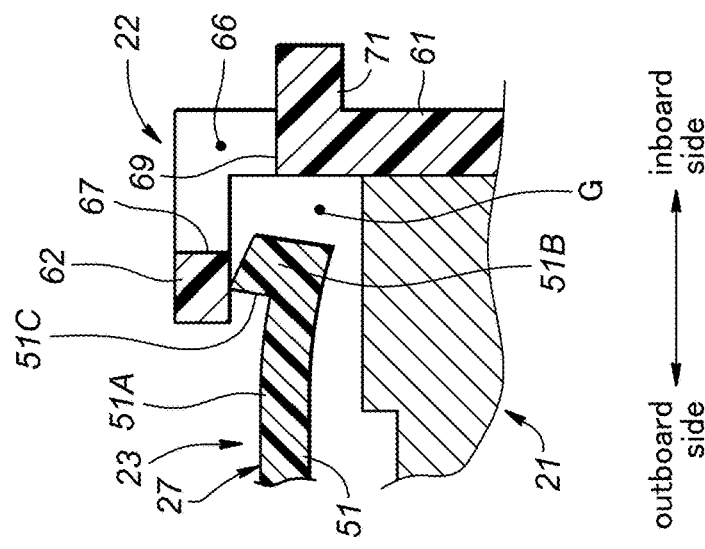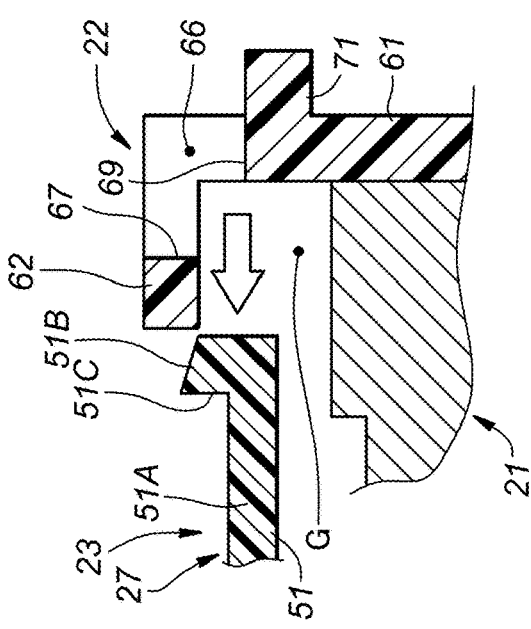

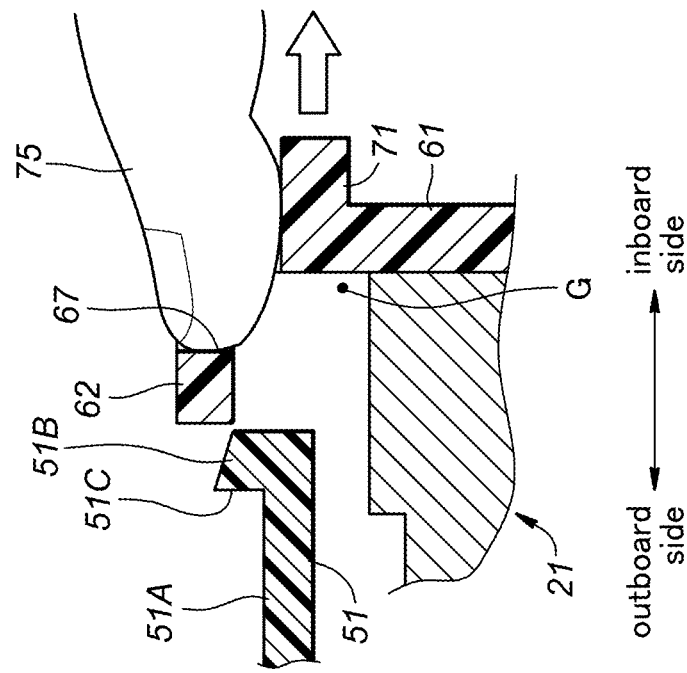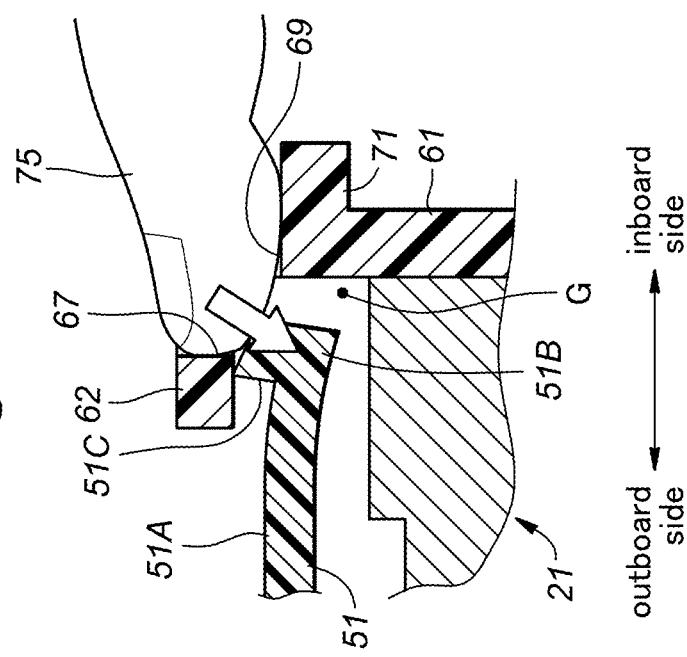

ATTACHMENT STRUCTURE OF CAMERA

TECHNICAL FIELD

The present invention relates to an attachment structure of a camera mounted on a vehicle.

BACKGROUND ART

In recent years, efforts have been actively made to provide access to sustainable transportation systems that take into account people in vulnerable situations among traffic participants. To achieve this, research and development for further improving safety and convenience of traffic through development of preventive safety technologies is attracting attention.

JP6482940B2 discloses an attachment structure of a camera for capturing the surrounding situation of a vehicle. The attachment structure of the camera described in JP6482940B2 includes the camera and a bracket (a holding member) for attaching the camera to a windshield.

Even after the vehicle is manufactured, there may be a need to attach and detach the camera to and from a window when the camera malfunctions. However, when the camera is surrounded by a vehicle body frame or when the camera is mounted deep inside a vehicle body, a working space for attaching and detaching the camera is limited, and an operator may only be able to insert one arm into the working space. In such a case, the work efficiency of attaching and detaching the camera to and from the window may decrease.

SUMMARY OF THE INVENTION

In view of the above background, an object of the present invention is to improve the work efficiency of an attachment and detachment operation of a camera to and from a window, in an attachment structure for attaching the camera arranged on an inboard side of the window of a vehicle to the window. This will ultimately contribute to a development of a sustainable transportation system.

To achieve such an object, one aspect of the present invention provides an attachment structure (20) for attaching a camera (21) arranged on an inboard side of a window (8) of a vehicle (1) to the window, the attachment structure comprising: an attachment member (22) attached to the camera; and a holding member (23) fixed to an inner surface of the window and holding the attachment member, wherein the holding member includes: a fixed frame (25) fixed to the inner surface of the window; a hood (26) protruding from the fixed frame toward the inboard side and defining a field-of-view space (S) of the camera; and a receiving tube (27) extending from the hood toward the inboard side around an axis (A2) and receiving the camera, and the receiving tube includes a pair of engaging claws (51) that are elastically deformable, the attachment member includes: a base portion (61) that supports the camera; and a pair of sidewall portions (62) extending from the base portion toward an outboard side and positioned on either side of the receiving tube, and each of the sidewall portions is provided with an engagement hole (66) with which each of the engaging claws engages from a side of the axis, and the engagement hole penetrates each of the sidewall portions in a direction perpendicular to the axis.

According to this aspect, by pushing the attachment member attached to the camera from the inboard side against the holding member fixed to the inner surface of the window, an operator can engage the engaging claws of the holding member with the engagement holes of the attachment member. This allows the camera to be attached to the window via the attachment member and the holding member. The operator may detach the attachment member from the holding member by pulling out the attachment member to the inboard side relative to the holding member while pressing the engaging claws of the holding member engaged with the engagement holes of the attachment member toward the axis, thereby detaching the camera from the window. As described above, the operator can attach and detach the camera to and from the window through simple operations. Accordingly, even if the working space for attaching and detaching the camera is limited and the operator can only insert one arm into the working space, the work efficiency of attaching and detaching the camera to and from the window can be improved.

In the above aspect, preferably, the engagement hole is formed so as to extend from the base portion to each of the sidewall portions, and penetrates the base portion in a direction parallel to the axis.

According to this aspect, even in situations where the operator cannot visually confirm the engagement position of the engagement hole of the attachment member and each of the engaging claws of the holding member, the operator can confirm the engagement position of the engagement hole and each of the engaging claws by touching each of the engaging claws with the finger through the engagement hole. Accordingly, the operator can easily press each of the engaging claws engaged with the engagement hole toward the axis, and easily detach the attachment member from the holding member.

In the above aspect, preferably, the base portion includes a protruding portion (71) protruding from an edge portion of the engagement hole toward the inboard side.

According to this aspect, even in situations where the operator cannot visually confirm the engagement position of the engagement hole of the attachment member and each of the engaging claws of the holding member, the operator can easily confirm the engagement position of the engagement hole and each of the engaging claws by touching the protruding portion with the finger. Accordingly, the operator can more easily press each of the engaging claws engaged with the engagement hole toward the axis, and more easily detach the attachment member from the holding member.

In the above aspect, preferably, a surface of the protruding portion on a side opposite to the axis is parallel to the axis.

According to this aspect, the operator can stably grip the attachment member. Accordingly, the operator can more easily press each of the engaging claws engaged with the engagement hole toward the axis, and more easily detach the attachment member from the holding member.

In the above aspect, preferably, each of the engaging claws includes: a piece (51A) extending along a direction parallel to the axis; and a claw (51B) protruding from a tip of the piece toward a side opposite to the axis, and the claw engages with the engagement hole.

According to this aspect, each of the engaging claws is formed with a simple structure.

In the above aspect, preferably, each of the engaging claws is defined by a slit (53) provided in the receiving tube.

According to this aspect, each of the engaging claws is formed with a simple structure.

In the above aspect, preferably, a harness (57) is connected to the camera, and the fixed frame is provided with a harness holder (35) that holds the harness.

According to this aspect, interference between the harness and other members provided to the vehicle is suppressed.

In the above aspect, preferably, the harness holder includes a pair of protruding pieces protruding from a surface of the fixed frame on the inboard side and spaced apart from each other, and the harness is sandwiched by the pair of protruding pieces.

According to this aspect, since the harness is sandwiched by the pair of protruding pieces, movement of the harness is restricted and interference between the harness and other members provided to the vehicle is further suppressed.

Thus, according to the above aspects, it is possible to improve the work efficiency of an attachment and detachment operation of a camera to and from a window, in an attachment structure for attaching the camera arranged on an inboard side of the window of a vehicle to the window.

BRIEF DESCRIPTION OF THE DRAWING(S)

FIGS. 10A to 10C are explanatory diagrams illustrating a procedure for causing the holding member to hold the attachment member to which the camera is attached; and FIGS. 11A and 11B are explanatory diagrams illustrating a procedure for detaching the attachment member to which the camera is attached from the holding member.

DETAILED DESCRIPTION OF THE INVENTION

In the following, an embodiment of a vehicle 1 provided with an attachment structure of a camera (hereinafter referred to as "the camera attachment structure 20") according to the present invention will be described with reference to the drawings. An arrow FR, which is appropriately attached to each figure, indicates the front of the vehicle 1.

Figure 1:
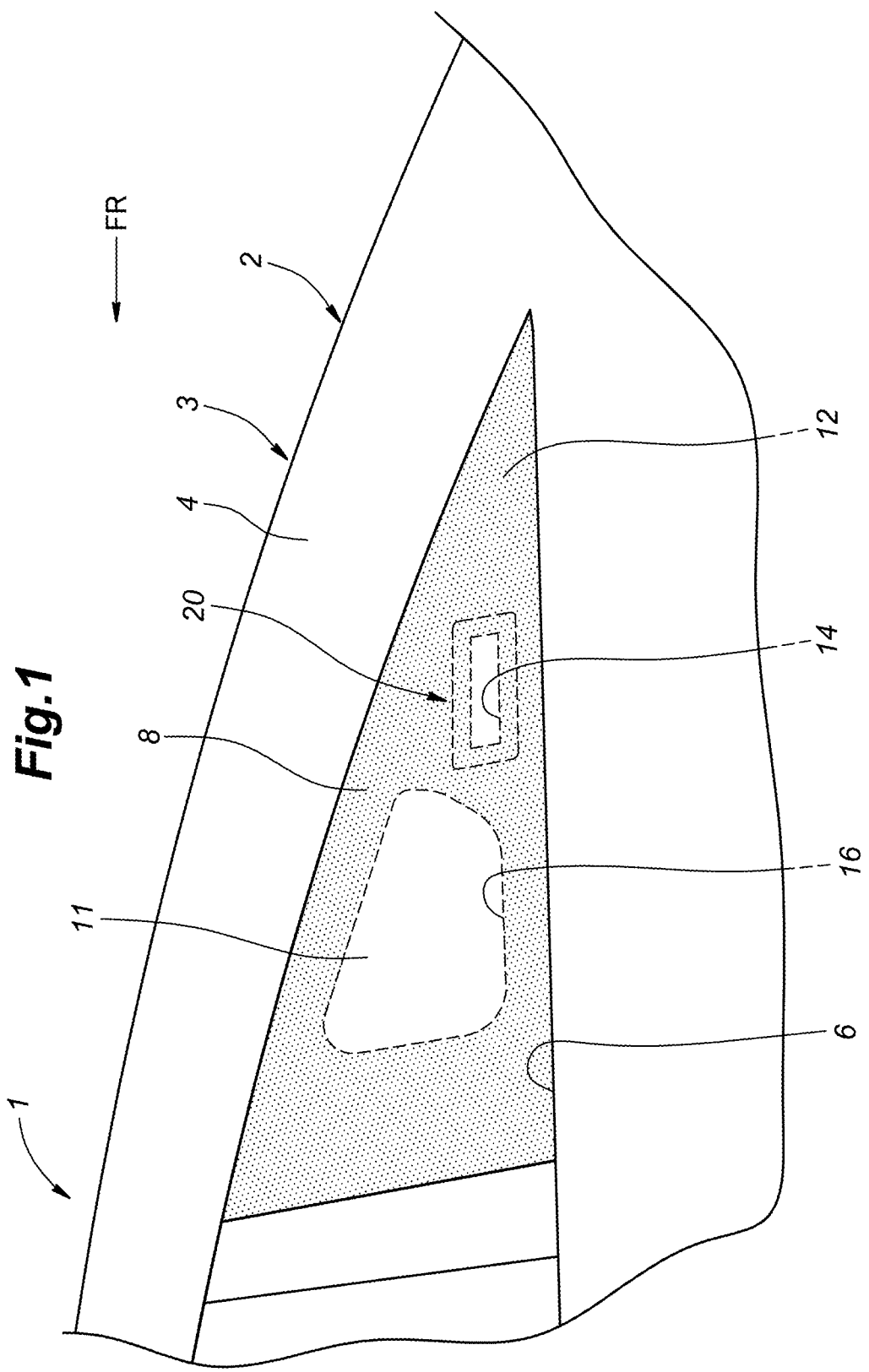
FIG. 1 is a side view showing a rear portion of a side structure of a vehicle according to an embodiment.

The vehicle 1 is, for example, a four-wheeled automobile. As shown in FIG. 1, the vehicle 1 includes side structures 2 that constitute the left and right side portions of the vehicle 1. Each side structure 2 of the vehicle 1 includes a vehicle body frame 3 (see FIG. 2). The vehicle body frame 3 is formed, for example, by joining an outer panel 4 arranged on the laterally outer side of the vehicle 1 and an inner panel 5 (see FIG. 2) arranged on the laterally inner side of the outer panel 4.

An opening portion 6 that penetrates in the lateral direction is provided in the portion of the outer panel 4 that corresponds to the rear portion of each side structure 2. The opening portion 6 of the outer panel 4 is formed in a substantially triangular shape. The opening portion 6 of the outer panel 4 is provided with a quarter glass 8 (an example of a window). In the present embodiment, the quarter glass 8 includes a base material layer 11 and a light shielding layer 12 superimposed on the base material layer 11 from the inboard side. The base material layer 11 is made of glass and has transparency. The light shielding layer 12 is made of black ceramic printed on the inner surface (inboard side surface) of the base material layer 11 and has no transparency. The light shielding layer 12 is provided with a first opening portion 14 having a substantially rectangular shape and a second opening portion 16 having a substantially trapezoidal shape.

Figure 2:
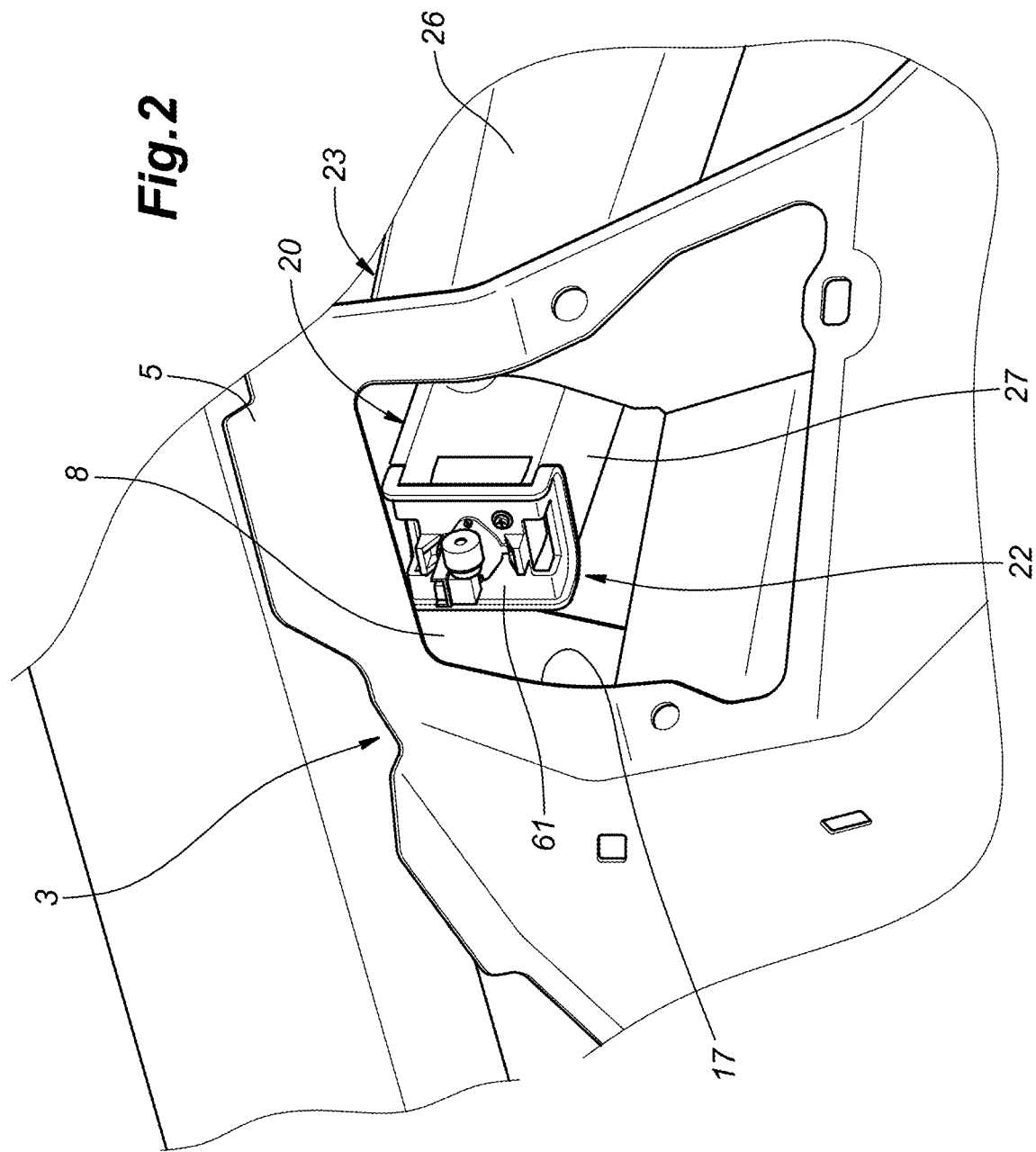
FIG. 2 is a perspective view of an attachment structure of a camera seen from an inboard side of the vehicle according to the embodiment.

As shown in FIG. 2, the inner panel 5 is provided with an opening portion 17 that penetrates in the lateral direction. The opening portion 17 of the inner panel 5 has a size to allow an operator's arm to pass through the opening portion 17. An operator can access the inner surface (inboard side surface) of the quarter glass 8 by passing the arm through the opening portion 17 of the inner panel 5 from the inboard side.

Figure 3:
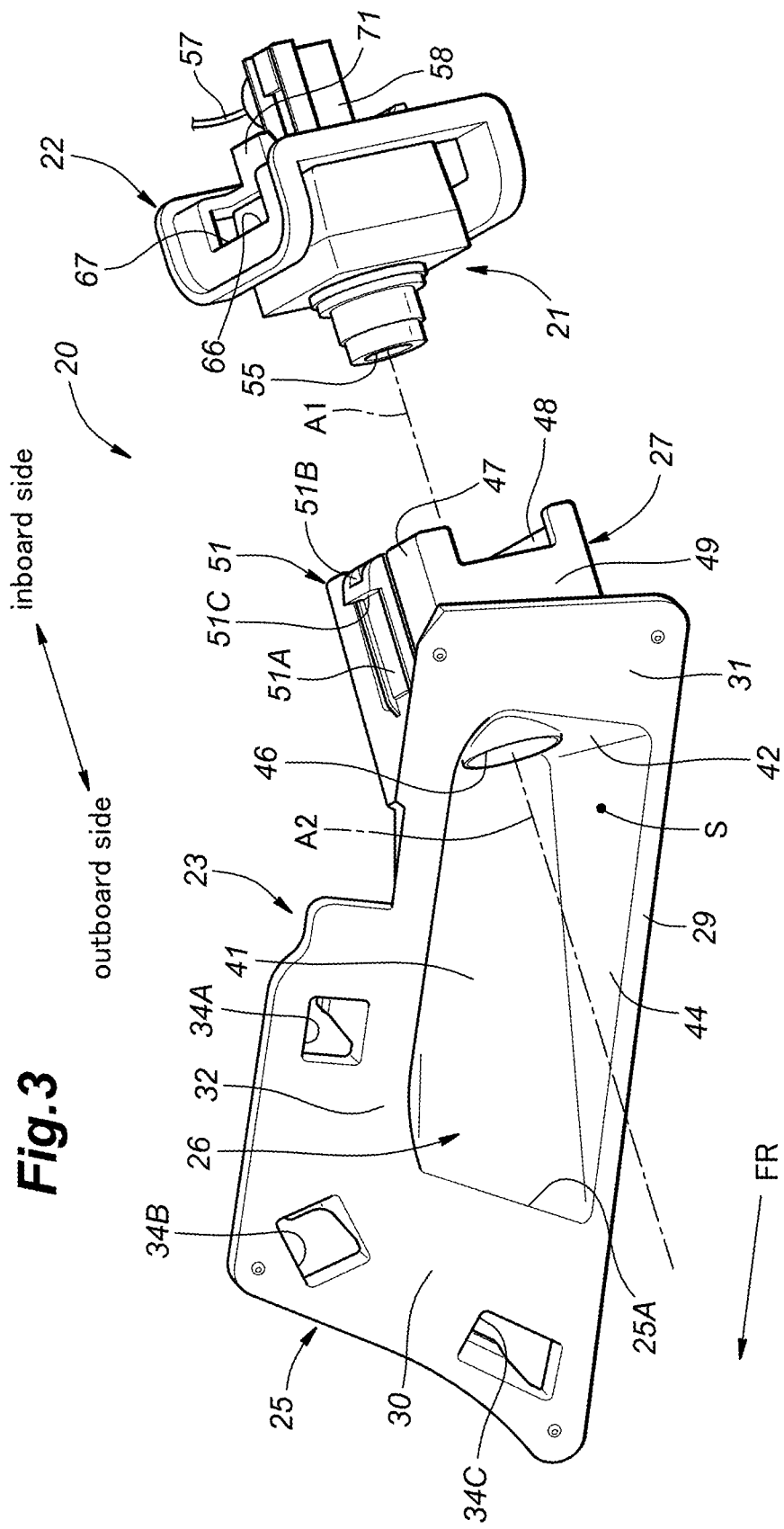
FIG. 3 is an exploded perspective view showing the attachment structure of the camera according to the embodiment.

As shown in FIG. 3, the camera attachment structure 20 is a structure for attaching a camera 21 arranged on the inboard side of the quarter glass 8 to the quarter glass 8. The camera attachment structure 20 includes the camera 21 that captures the surroundings of the vehicle 1, an attachment member 22 attached to the camera 21, and a holding member 23 fixed to the inner surface (inboard side surface) of the quarter glass 8 and holding the attachment member 22. In the present embodiment, the camera 21 is arranged so as to capture the front and the lateral outside of the vehicle 1. That is, an optical axis A1 of the camera 21 faces toward the front and the lateral outside of the vehicle 1.

As shown in FIGS. 3 to 6, the holding member 23 includes a fixed frame 25 fixed to the inner surface of the quarter glass 8, a hood 26 protruding from the fixed frame 25 toward the inboard side and defining a field-of-view space S of the camera 21, and a receiving tube 27 extending from the hood 26 toward the inboard side around an axis A2 and receiving the camera 21.

The fixed frame 25 is formed in a rectangular frame shape provided along the inner surface of the quarter glass 8 and defines a rectangular opening 25A. The fixed frame 25 includes a lower plate 29 extending in the front-and-rear direction of the vehicle 1, a front plate 30 extending upward from the front end of the lower plate 29, a rear plate 31 extending upward from the rear end of the lower plate 29, and an upper plate 32 extending in the front-and-rear direction of the vehicle 1 and connecting the upper end of the front plate 30 and the upper end of the rear plate 31. The outer surface (outboard side surface) of the lower plate 29, the outer surface (outboard side surface) of the front plate 30, the outer surface (outboard side surface) of the rear plate 31, and the outer surface (outboard side surface) of the upper plate 32 are adhered to the inner surface (inboard side surface) of the quarter glass 8 by, for example, an adhesive and the like.

Figure 5:
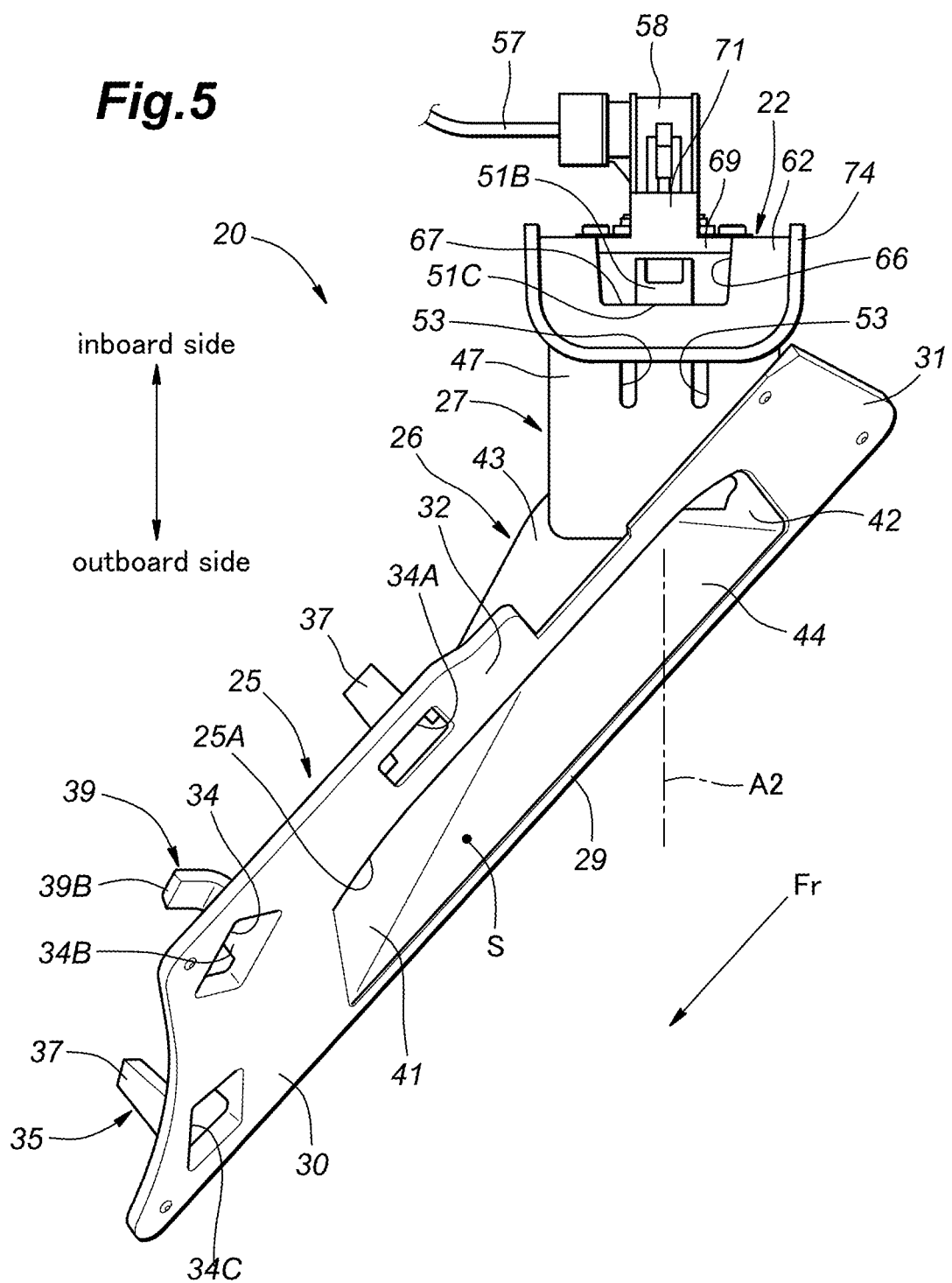
FIG. 5 is a plan view showing the attachment structure of the camera according to the embodiment.
Figure 6:
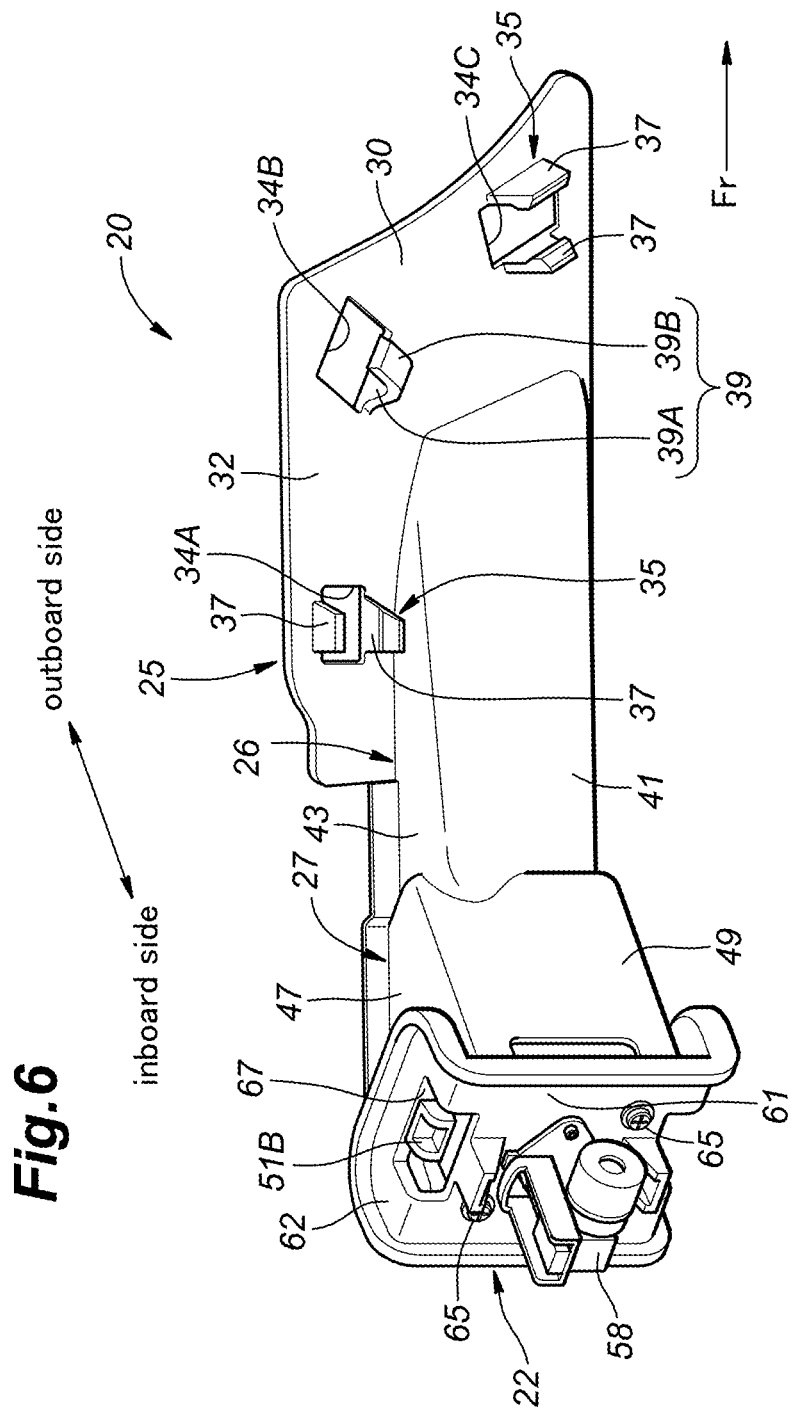
FIG. 6 is a perspective view of the attachment structure of the camera seen from the rear (the inboard side) according to the embodiment.

As shown in FIGS. 5 and 6, the fixed frame 25 is provided with a plurality of through holes 34 that penetrate therethrough in the lateral direction, a pair of harness holders 35 that hold a harness 57 of the camera 21 described later, and a hooking claw 39 to which the harness 57 of the camera 21 is hooked. In the present embodiment, three through holes 34 are spaced apart from each other and arranged from the upper plate 32 of the fixed frame 25 to the front plate 30 of the fixed frame 25. More specifically, the through holes 34 include a first through hole 34A provided above the opening 25A of the fixed frame 25, a second through hole 34B provided in front of and above the opening 25A of the fixed frame 25, and a third through hole 34C provided in front of the opening 25A of the fixed frame 25.

Each harness holder 35 includes a pair of protruding pieces 37 protruding from the inner surface (inboard side surface) of the fixed frame 25 and spaced apart from each other. Each protruding piece 37 is formed in a plate shape. In the present embodiment, each protruding piece 37 protrudes laterally inward from the edge portion of the first through hole 34A of the fixed frame 25 and the edge portion of the third through hole 34C of the fixed frame 25. The tip (laterally inward end) of each protruding piece 37 bulges out toward the central axis of the corresponding through hole 34A or 34C.

The hooking claw 39 includes a protruding portion 39A (see FIG. 6) protruding laterally inward from the edge portion of the second through hole 34B of the fixed frame 25, and a bent portion 39B bent from the tip (end on the inboard side) of the protruding portion 39A toward the central axis of the second through hole 34B. The protruding portion 39A and the bent portion 39B are formed in a plate shape. The protruding portion 39A is provided on the edge portion of the second through hole 34B on the side of the opening 25A of the fixed frame 25.

The hood 26 is formed integrally with the fixed frame 25. The hood 26 includes a front wall portion 41 which inclines laterally inward from the front plate 30 of the fixed frame 25 toward the rear of the vehicle 1, a rear wall portion 42 which inclines laterally inward from the rear plate 31 of the fixed frame 25 toward the front of the vehicle 1 and is connected to the rear end (end on the inboard side) of the front wall portion 41, an upper wall portion 43 which extends laterally inward from the upper plate 32 of the fixed frame 25 and connects the upper end of the front wall portion 41 to the upper end of the rear wall portion 42, and a bottom wall portion 44 which extends laterally inward from the lower plate 29 of the fixed frame 25 and connects the lower end of the front wall portion 41 to the lower end of the rear wall portion 42. A receiving hole 46 penetrating in a direction parallel to the optical axis A1 of the camera 21 is formed in the rear wall portion 42. A lens 55 of the camera 21, which will be described later, is arranged in the receiving hole 46.

Figure 4:
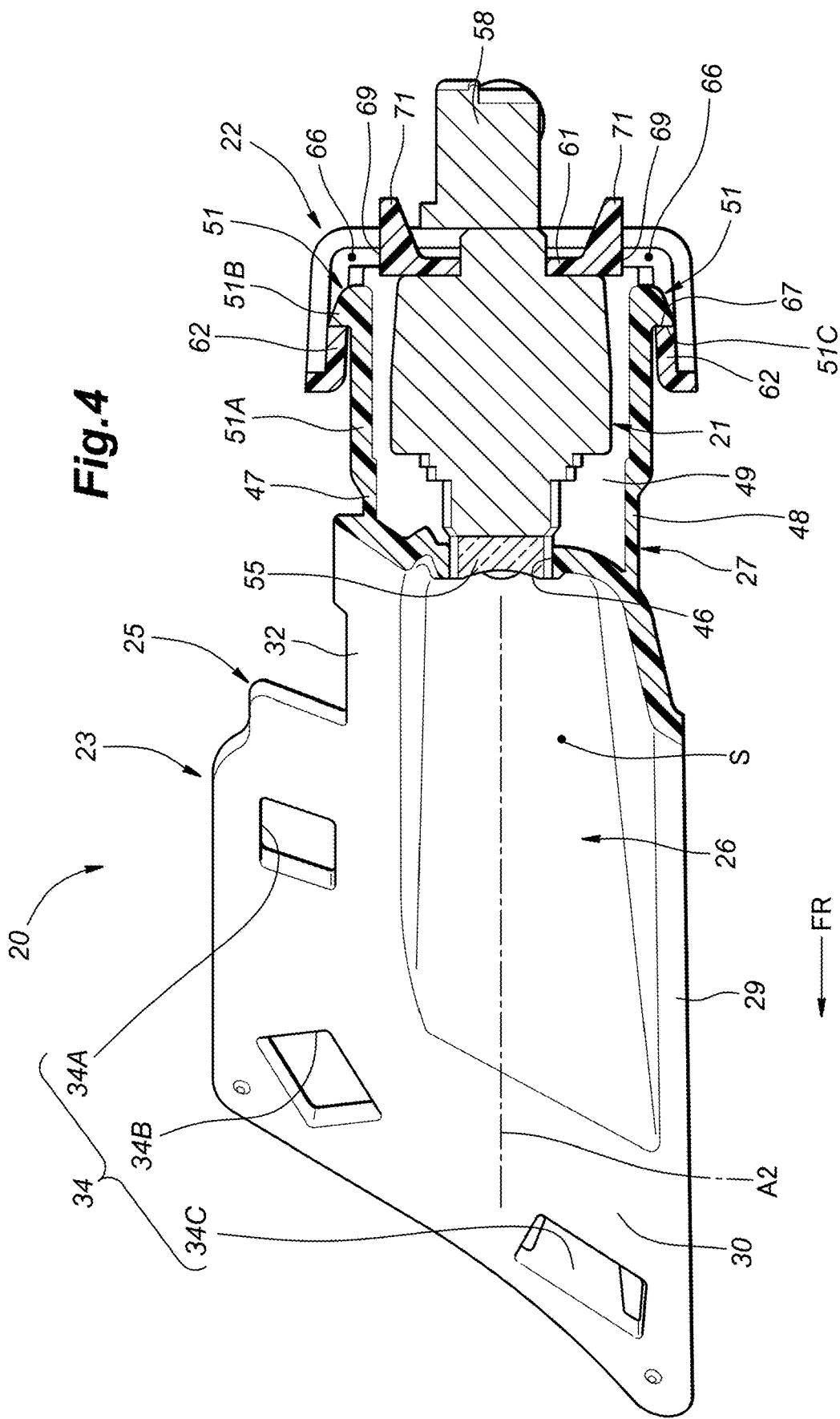
FIG. 4 is a cross-sectional view showing the attachment structure of the camera according to the embodiment.

As shown in FIGS. 3 to 5, the field-of-view space S of the camera 21 is defined by the front wall portion 41, the rear wall portion 42, the upper wall portion 43, and the bottom wall portion 44. The field-of-view space S of the camera 21 is a space through which light from the outside of the vehicle 1 is incident on the lens 55 of the camera 21, which will be described later. The field-of-view space S of the camera 21 is provided at a position corresponding to the first opening portion 14 (see FIG. 1) of the light shielding layer 12 of the quarter glass 8. That is, light from the outside of the vehicle 1 passes through the first opening portion 14 of the light shielding layer 12 of the quarter glass 8 and enters the field-of-view space S of the camera 21.

As shown in FIGS. 3 to 6, the receiving tube 27 is formed integrally with the fixed frame 25 and the hood 26. In the present embodiment, the receiving tube 27 is formed in a rectangular tube shape. The axis A2 of the receiving tube 27 is aligned with the optical axis A1 of the camera 21. That is, the receiving tube 27 protrudes from the hood 26 toward the inboard side along the optical axis A1 of the camera 21.

The receiving tube 27 includes an upper wall 47 connected to the upper wall portion 43 of the hood 26, a lower wall 48 connected to the bottom wall portion 44 of the hood 26, and a pair of side walls 49 connecting both side portions of the upper wall 47 and both side portions of the lower wall 48.

The receiving tube 27 includes a pair of engaging claws 51 that are elastically deformable in a direction intersecting the axis A2 of the receiving tube 27. Each engaging claw 51 includes a piece 51A extending along a direction parallel to the axis A2 of the receiving tube 27, and a claw 51B protruding from the tip (end on the inboard side) of the piece 51A toward the side opposite to the axis A2 of the receiving tube 27. As shown in FIG. 5, each engaging claw 51 is defined by a pair of slits 53 provided in the receiving tube 27.

In the present embodiment, the pair of slits 53 extends along a direction parallel to the axis A2 of the receiving tube 27 and is spaced apart from each other. In the present embodiment, the piece 51A of one engaging claw 51 is defined by the pair of slits 53 provided in the upper wall 47 of the receiving tube 27. Each slit 53 provided in the upper wall 47 is formed from the central portion of the upper wall 47 to the tip (end on the inboard side) of the upper wall 47. Further, the piece 51A of the other engaging claw 51 is defined by the pair of slits 53 provided in the lower wall 48 of the receiving tube 27. Each slit 53 provided in the lower wall 48 is formed from the central portion of the lower wall 48 to the tip (end on the inboard side) of the lower wall 48. The tip (end on the inboard side) of each engaging claw 51 is arranged on the outboard side relative to the tip (end on the inboard side) of the receiving tube 27.

As shown in FIG. 4, the claw 51B of each engaging claw 51 includes an abutting surface 51C facing the outboard side. Further, the outer surface (surface on a side opposite to the axis A2 of the receiving tube 27) of the claw 51B of each engaging claw 51 inclines toward the axis A2 of the receiving tube 27 and toward the tip (inboard side).

Figure 7:
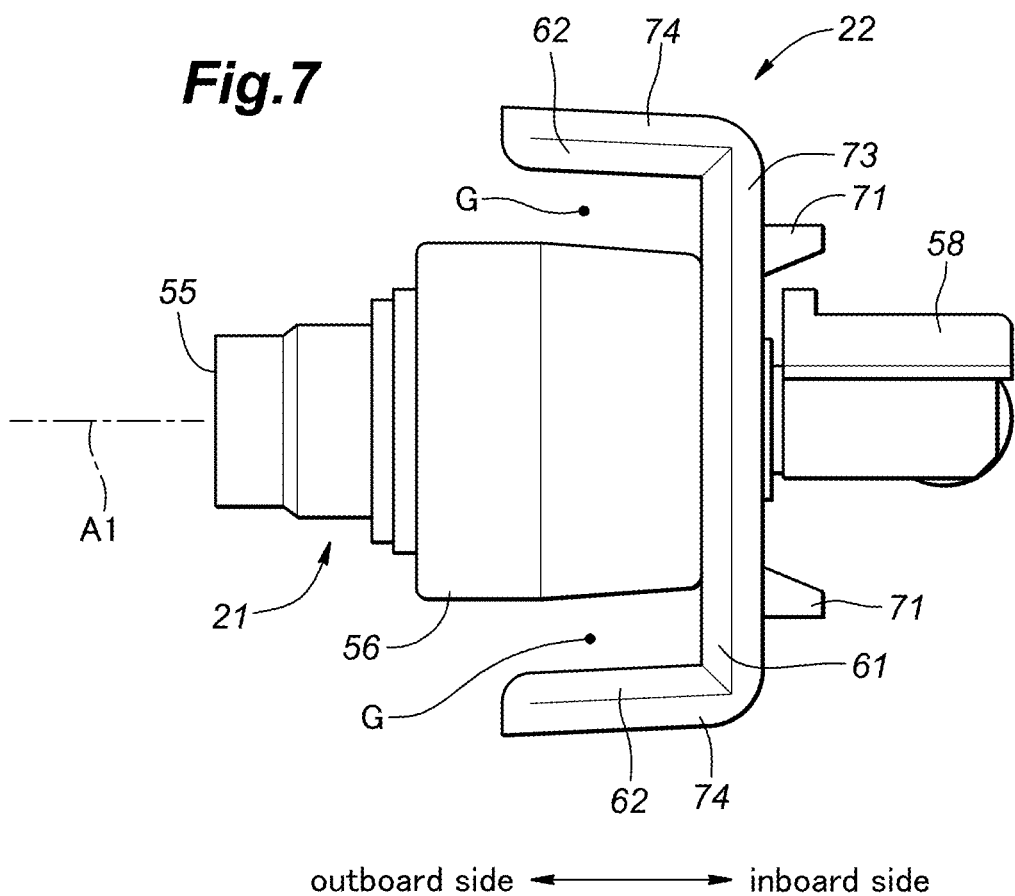
FIG. 7 is a side view showing a state where the camera is attached to an attachment member.
Figure 8:
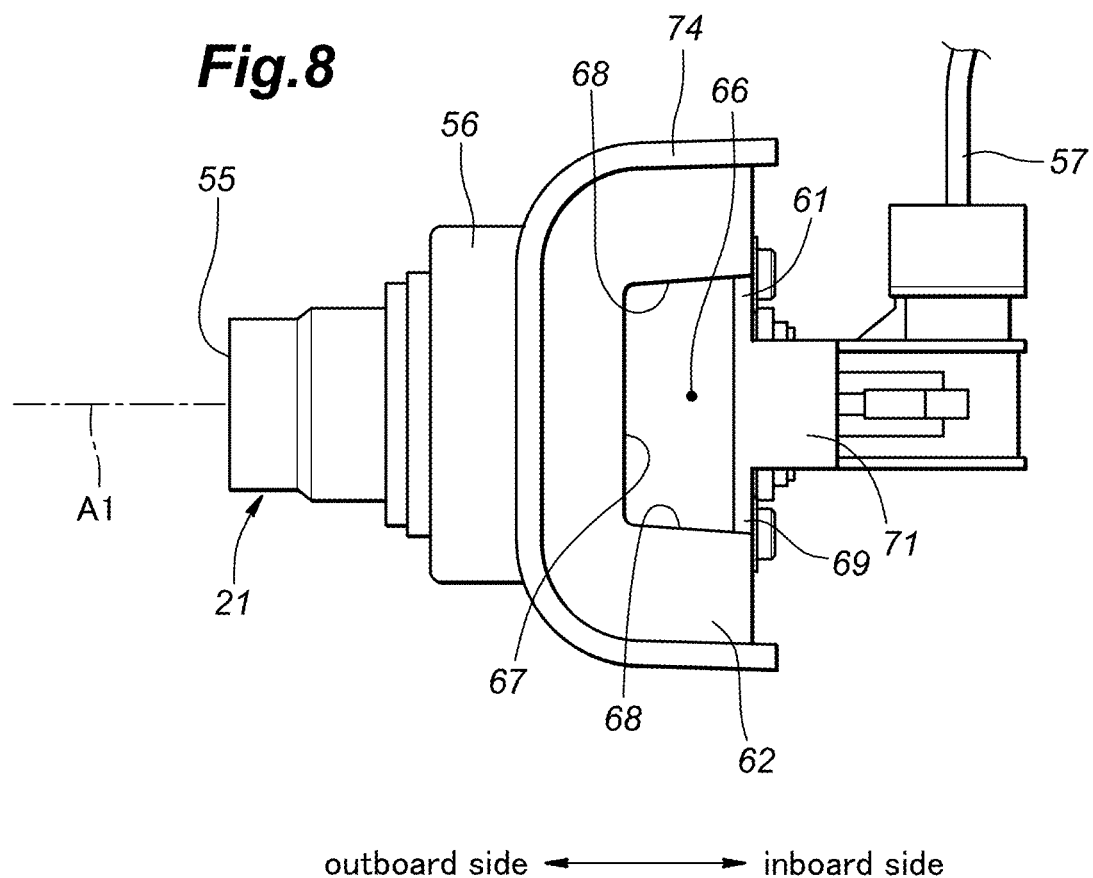
FIG. 8 is a plan view showing a state where the camera is attached to the attachment member.

As shown in FIGS. 4, 7 and 8, the camera 21 includes, for example, the lens 55 forming an optical system, an image sensor (not shown) such as a Charge Coupled Device (CCD) or a Complementary Metal Oxide Semiconductor (CMOS), a casing 56 that houses the lens 55 and the image sensor, a terminal (not shown) connected to the image sensor, the harness 57 having one end connected to the terminal, and a connector 58 that houses one end of the harness 57.

The casing 56 is formed in a substantially rectangular tubular shape extending in a direction parallel to the axis A2 of the receiving tube 27 (i.e., the optical axis A1 of the camera 21). The lens 55 is arranged in the front portion (outboard side portion) of the casing 56. The lens 55 of the camera 21 is received in the receiving hole 46 provided in the rear wall portion 42 of the hood 26. The connector 58 is provided in the rear portion (inboard side portion) of the casing 56. A plurality of fastening holes (not shown) penetrating in a direction parallel to the axis A2 of the receiving tube 27 is provided on the rear end surface (end surface on the inboard side) of the casing 56. Each fastening hole is provided with a female thread (not shown).

Figure 9:
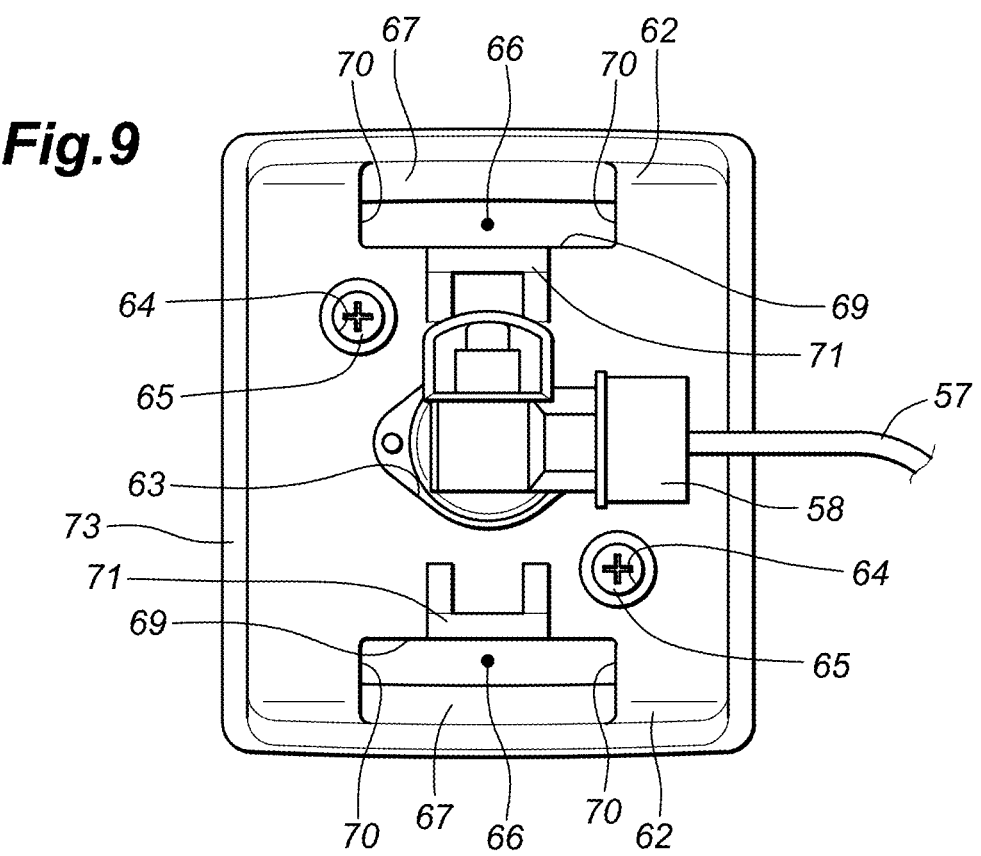
FIG. 9 is a rear view showing a state where the camera is attached to the attachment member.

As shown in FIGS. 7 to 9, the attachment member 22 is made of a resin material. The attachment member 22 includes a base portion 61 that supports the camera 21 and a pair of sidewall portions 62 that extend from the base portion 61 toward the outboard side.

The base portion 61 is formed in a plate shape. The main surface of the base portion 61 faces a direction parallel to the axis A2 of the receiving tube 27 (i.e., the optical axis A1 of the camera 21). As shown in FIG. 9, the base portion 61 is provided with a first through hole 63 and a plurality of second through holes 64 that penetrate in a direction parallel to the axis A2 of the receiving tube 27. The first through hole 63 is provided in the central portion of the base portion 61. The connector 58 of the camera 21 penetrates the first through hole 63. The central axis of each second through hole 64 is aligned with the central axis of a corresponding fastening hole in the casing 56 of the camera 21. The camera 21 is fastened to the attachment member 22 by, for example, a bolt 65 that penetrates each second through hole 64 of the base portion 61 and screws into the female thread of the corresponding fastening hole of the casing 56.

As shown in FIGS. 7 and 8, each sidewall portion 62 is formed in a plate shape. The main surface of each sidewall portion 62 faces a direction perpendicular to the axis A2 of the receiving tube 27. In the present embodiment, the pair of sidewall portions 62 is connected to the upper and lower ends of the base portion 61.

As shown in FIG. 7, a gap G is formed between each sidewall portion 62 and the corresponding upper or lower surface of the casing 56 of the camera 21. More specifically, the sidewall portion 62 connected to the upper end of the base portion 61 is arranged higher than the upper surface of the casing 56 of the camera 21. The upper wall 47 of the receiving tube 27 is arranged in the gap G between the sidewall portion 62 connected to the upper end of the base portion 61 and the upper surface of the casing 56 of the camera 21. Additionally, the sidewall portion 62 connected to the lower end of the base portion 61 is arranged lower than the lower surface of the casing 56 of the camera 21. The lower wall 48 of the receiving tube 27 is arranged in the gap G between the sidewall portion 62 connected to the lower end of the base portion 61 and the lower surface of the casing 56 of the camera 21.

As shown in FIGS. 8 and 9, the attachment member 22 is provided with a pair of engagement holes 66. Each engaging claw 51 of the receiving tube 27 engages with each engagement hole 66 from the side of the axis A2 of the receiving tube 27. Each engagement hole 66 is provided on the base portion 61 and each sidewall portion 62. That is, each engagement hole 66 is formed so as to extend from the base portion 61 to each sidewall portion 62. The portion of the engagement hole 66 provided on the base portion 61 penetrates the base portion 61 in a direction parallel to the axis A2 of the receiving tube 27. Further, the portion of the engagement hole 66 provided on each sidewall portion 62 penetrates each sidewall portion 62 in a direction perpendicular to the axis A2 of the receiving tube 27. As shown in FIG. 8, each sidewall portion 62 includes a first end edge 67 that defines one end (outboard side end) of each engagement hole 66, and a pair of first side edges 68 that extend from the first end edge 67 toward the inboard side. As shown in FIG. 9, the base portion 61 includes a second end edge 69 that defines the other end (end on the side of the optical axis A1 of the camera 21) of each engagement hole 66, and a pair of second side edges 70 that extend from the second end edge 69 to the side opposite to the optical axis A1 of the camera 21 and are connected to the corresponding first side edges 68. The distance in the up-and-down direction from the second end edge 69 of the base portion 61 to the inner surface (surface on the side of the axis A2 of the receiving tube 27) of the sidewall portion 62 is substantially equal to the component in the up-and-down direction of the displacement amount of the engaging claw 51 required to release the abutment between the first end edge 67 of the sidewall portion 62 and the abutting surface 51C of the engaging claw 51.

As shown in FIG. 4, the first end edge 67 of each sidewall portion 62 abuts against the abutting surface 51C of the claw 51B of the corresponding engaging claw 51. Further, the end (end on the inboard side) of the receiving tube 27 abuts against the outer surface (surface on the outboard side) of the base portion 61. The tip (end on the inboard side) of each engaging claw 51 of the receiving tube 27 is arranged on the outboard side of the outer surface (surface on the outboard side) of the base portion 61.

As shown in FIGS. 7 to 9, the base portion 61 is provided with a pair of protruding portions 71. Each protruding portion 71 protrudes from the edge portion of each engagement hole 66 toward the inboard side. The outer surface (surface opposite to the axis A2 of the receiving tube 27) of each protruding portion 71 is arranged on the same plane as the second end edge 69 of the base portion 61 (see FIG. 8). Further, the outer surface of each protruding portion 71 is parallel to the axis A2 of the receiving tube 27.

On both side portions of the base portion 61, first upright walls 73 protruding from the inner surface (inboard side surface) of the base portion 61 toward the inboard side are provided. Further, a second upright wall 74 connected to the first upright walls 73 and protruding toward the side opposite to the axis A2 of the receiving tube 27 is provided around the edge portion of each sidewall portion 62.

An operation for attaching the camera 21 to the quarter glass 8 in the camera attachment structure 20 configured as above will be described. In the following, a description will be given on the assumption that the holding member 23 has already been fixed to the inner surface of the quarter glass 8, and the camera 21 has already been attached to the attachment member 22.

First, the operator grips the attachment member 22. More specifically, the operator grips the pair of protruding portions 71 provided on the base portion 61 of the attachment member 22 from the side opposite to the optical axis A1 of the camera 21. Next, while holding the pair of protruding portions 71, the operator passes the arm gripping the pair of protruding portions 71 through the opening portion 17 of the inner panel 5 from the inboard side. As shown in FIG. 10A, the operator then inserts the camera 21 attached to the attachment member 22 into the receiving tube 27 of the holding member 23. At this time, the upper wall 47 and the lower wall 48 of the receiving tube 27 are inserted into the gap G provided between each sidewall portion 62 of the attachment member 22 and the casing 56 of the camera 21. When the camera 21 is inserted into the prescribed position in the receiving tube 27, the claw 51B of each engaging claw 51 provided in the receiving tube 27 abuts against the inner surface (surface on the side of the axis A2 of the receiving tube 27) of the corresponding sidewall portion 62. As shown in FIG. 10B, as the camera 21 is further inserted into the receiving tube 27, the claw 51B of each engaging claw 51 is pressed by the inner surface of the corresponding sidewall portion 62, and the piece 51A of each engaging claw 51 elastically deforms toward the axis A2 of the receiving tube 27. As shown in FIG. 10C, when the operator pushes the attachment member 22 toward the receiving tube 27 from the inboard side to further insert the camera 21 into the receiving tube 27, the first end edge 67 of each sidewall portion 62 moves further toward the outboard side than the abutting surface 51C of the claw 51B of the corresponding engaging claw 51. At this time, the elastic deformation of the piece 51A of each engaging claw 51 is released, and the piece 51A of each engaging claw 51 returns to its original position. Additionally, against the first end edge 67 of each sidewall portion 62, the abutting surface 51C of the claw 51B of the corresponding engaging claw 51 abuts. In this manner, each engaging claw 51 engages with the corresponding engagement hole 66 from the side of the axis A2 of the receiving tube 27.

Next, the operator causes the harness holders 35 provided on the fixed frame 25 of the holding member 23 to hold the harness 57 of the camera 21. The operator also hooks the harness 57 of the camera 21 to the hooking claw 39 provided on the fixed frame 25 of the holding member 23. Accordingly, the camera 21 is attached to the quarter glass 8 via the attachment member 22 and the holding member 23.

In another embodiment, the operator may cause the harness holders 35 to hold the harness 57 of the camera 21 and then insert the camera 21 into the receiving tube 27 of the holding member 23.

Next, the operation for detaching the camera 21 from the quarter glass 8 in the camera attachment structure 20 will be described.

First, the operator detaches the harness 57 of the camera 21 from the harness holders 35 of the holding member 23. Next, the operator passes the arm through the opening portion 17 of the inner panel 5 from the inboard side. As shown in FIG. 11A, the operator then grips the pair of protruding portions 71 of the attachment member 22. Furthermore, the operator presses the claw 51B of each engaging claw 51 toward the axis A2 of the receiving tube 27 with the finger 75, causing the piece 51A of each engaging claw 51 to elastically deform toward the axis A2 of the receiving tube 27. This releases the abutment between the abutting surface 51C of the claw 51B of each engaging claw 51 and the first end edge 67 of the corresponding sidewall portion 62, and each engaging claw 51 disengages from the corresponding engagement hole 66. Next, the operator pulls out the camera 21 from the receiving tube 27 toward the inboard side while keeping the claw 51B of each engaging claw 51 pressed toward the axis A2 of the receiving tube 27. When the camera 21 is pulled out from the receiving tube 27 to the prescribed position, the first end edge 67 of each sidewall portion 62 moves further toward the inboard side than the abutting surface 51C of the claw 51B of the corresponding engaging claw 51. Accordingly, the claw 51B of each engaging claw 51 is pressed by the inner surface (surface on the side of the axis A2 of the receiving tube 27) of the corresponding sidewall portion 62. As shown in FIG. 11B, when the camera 21 is further pulled out from the receiving tube 27 and the tip (end on the outboard side) of each sidewall portion 62 moves further toward the inboard side than the claw 51B of the corresponding engaging claw 51, the elastic deformation of the piece 51A of each engaging claw 51 is released and the piece 51A of each engaging claw 51 returns to its original position. Through the above operations, the camera 21 is detached from the quarter glass 8.

In the camera attachment structure 20 configured as described above, each engaging claw 51 provided in the receiving tube 27 engages with the corresponding engagement hole 66 from the side of the axis A2 of the receiving tube 27. Accordingly, by pushing the attachment member 22 attached to the camera 21 from the inboard side against the holding member 23 fixed to the inner surface of the quarter glass 8, the engaging claws 51 of the holding member 23 can engage with the engagement holes 66 of the attachment member 22. Thus, the camera 21 is attached to the quarter glass 8 via the attachment member 22 and the holding member 23. Further, the operator can detach the attachment member 22 from the holding member 23 by pressing the engaging claws 51 of the holding member 23 engaged with the engagement holes 66 of the attachment member 22 toward the axis A2 of the receiving tube 27 while pulling out the attachment member 22 to the inboard side relative to the holding member 23. This causes the camera 21 to be detached from the quarter glass 8. As described above, the operator can attach and detach the camera 21 to and from the quarter glass 8 through simple operations. Accordingly, even if the working space for attaching and detaching the camera 21 is limited and the operator can only insert one arm into the working space, the work efficiency of attaching and detaching the camera 21 to and from the quarter glass 8 can be improved.

Each engagement hole 66 is formed so as to extend from the corresponding sidewall portion 62 to the base portion 61, and the portion of each engagement hole 66 provided in the base portion 61 penetrates the base portion 61 in a direction parallel to the axis A2 of the receiving tube 27. Additionally, the base portion 61 is provided with the protruding portion 71 that protrudes from the edge portion of each engagement hole 66 toward the inboard side. Accordingly, even in situations where the operator cannot visually confirm the engagement position of the engagement hole 66 of the attachment member 22 and the engaging claw 51 of the holding member 23 due to the inner panel 5 of the vehicle body frame 3, the operator can easily confirm the engagement position of the engagement hole 66 and the engaging claw 51 by touching the protruding portion 71 with the finger 75. Accordingly, the operator can more easily press the engaging claws 51 engaged with the engagement holes 66 toward the axis A2 of the receiving tube 27, and more easily detach the attachment member 22 from the holding member 23.

The outer surface (surface opposite to the axis A2 of the receiving tube 27) of each protruding portion 71 is parallel to the axis A2 of the receiving tube 27. This allows the operator to stably grip the attachment member 22. Accordingly, the operator can more easily press the engaging claws 51 engaged with the engagement holes 66 toward the axis A2 of the receiving tube 27, and more easily detach the attachment member 22 from the holding member 23.

Each engaging claw 51 includes the piece 51A extending along a direction parallel to the axis A2 of the receiving tube 27, and the claw 51B protruding from the tip (end on the inboard side) of the piece 51A toward the side opposite to the axis A2 of the receiving tube 27. Additionally, each engaging claw 51 is defined by the slits 53 provided in the receiving tube 27, and thus each engaging claw 51 is formed with a simple structure.

The fixed frame 25 is provided with the pair of harness holders 35 which hold the harness 57 of the camera 21. Each harness holder 35 includes the pair of protruding pieces 37 which protrude from the inboard side surface of the fixed frame 25 and are spaced apart from each other. Since the harness 57 of the camera 21 is sandwiched by the pair of protruding pieces 37, movement of the harness 57 is restricted and interference between the harness 57 and other members provided on the vehicle 1 is further suppressed.

Concrete embodiments of the present invention have been described in the foregoing, but the present invention should not be limited by the foregoing embodiments and various modifications and alterations are possible within the scope of the present invention. For example, in the embodiment described above, the sidewall portions 62 of the attachment member 22 are provided at the upper and lower ends of the base portion 61, but they may be provided at the left and right ends of the base portion 61. In the embodiment described above, the quarter glass 8 is an example of a window. In another embodiment, a component other than the quarter glass 8 (for example, the windshield or the rear window) may be an example of a window.

The invention claimed is:

1. An attachment structure for attaching a camera arranged on an inboard side of a window of a vehicle to the window, the attachment structure comprising:
   an attachment member attached to the camera; and
   a holding member fixed to an inner surface of the window and holding the attachment member,
   wherein the holding member includes:
   a fixed frame fixed to the inner surface of the window;
   a hood protruding from the fixed frame toward the inboard side and defining a field-of-view space of the camera; and
   a receiving tube extending from the hood toward the inboard side around an axis and receiving the camera, and
   the receiving tube includes a pair of engaging claws that are elastically deformable,
   the attachment member includes:
   a base portion that supports the camera; and
   a pair of sidewall portions extending from the base portion toward an outboard side and positioned on either side of the receiving tube, and
   each of the sidewall portions is provided with an engagement hole with which each of the engaging claws engages from a side of the axis, and the engagement hole penetrates each of the sidewall portions in a direction perpendicular to the axis.

2. The attachment structure of the camera according to claim 1, wherein the engagement hole is formed so as to extend from the base portion to each of the sidewall portions, and penetrates the base portion in a direction parallel to the axis.

3. The attachment structure of the camera according to claim 2, wherein the base portion includes a protruding portion protruding from an edge portion of the engagement hole toward the inboard side.

4. The attachment structure of the camera according to claim 3, wherein a surface of the protruding portion on a side opposite to the axis is parallel to the axis.

5. The attachment structure of the camera according to claim 1, wherein each of the engaging claws includes:
   a piece extending along a direction parallel to the axis; and
   a claw protruding from a tip of the piece toward a side opposite to the axis, and
   the claw engages with the engagement hole.

6. The attachment structure of the camera according to claim 1, wherein each of the engaging claws is defined by a slit provided in the receiving tube.

7. The attachment structure of the camera according to claim 1, wherein a harness is connected to the camera, and
   the fixed frame is provided with a harness holder that holds the harness.

8. The attachment structure of the camera according to claim 7, wherein the harness holder includes a pair of protruding pieces protruding from a surface of the fixed frame on the inboard side and spaced apart from each other, and
   the harness is sandwiched by the pair of protruding pieces.

* * * * *